(12) United States Patent
Qu et al.

(10) Patent No.: US 10,469,529 B2
(45) Date of Patent: Nov. 5, 2019

(54) ADDRESS CHECKING TO PROTECT AGAINST DENIAL OF SERVICE ATTACK

(71) Applicant: Nicira, Inc., Palo Alto, CA (US)

(72) Inventors: Hongya Qu, San Jose, CA (US); Timothy Petty, San Francisco, CA (US)

(73) Assignee: Nicira, Inc., Palo Alto, CA (US)

( * ) Notice: Subject to any disclaimer, the term of this patent is extended or adjusted under 35 U.S.C. 154(b) by 151 days.

(21) Appl. No.: 15/649,203

(22) Filed: Jul. 13, 2017

(65) Prior Publication Data
US 2019/0020679 A1    Jan. 17, 2019

(51) Int. Cl.
| | | |
|---|---|---|
| G06F 12/14 | (2006.01) |
| H04L 29/06 | (2006.01) |
| H04L 12/46 | (2006.01) |
| H04L 29/12 | (2006.01) |
| H04L 12/721 | (2013.01) |
| H04L 12/741 | (2013.01) |
| H04L 12/931 | (2013.01) |
| H04L 29/08 | (2006.01) |
| H04L 12/715 | (2013.01) |
| H04L 12/823 | (2013.01) |

(52) U.S. Cl.
CPC ...... *H04L 63/1458* (2013.01); *H04L 12/4633* (2013.01); *H04L 45/66* (2013.01); *H04L 45/74* (2013.01); *H04L 49/70* (2013.01); *H04L 61/103* (2013.01); *H04L 61/2007* (2013.01); *H04L 63/029* (2013.01); *H04L 63/0428* (2013.01); *H04L 67/10* (2013.01); *H04L 69/22* (2013.01); *H04L 45/64* (2013.01); *H04L 47/32* (2013.01); *H04L 61/6022* (2013.01)

(58) Field of Classification Search
None
See application file for complete search history.

(56) References Cited

U.S. PATENT DOCUMENTS

| | | | |
|---|---|---|---|
| 7,234,163 B1 * | 6/2007 | Rayes | H04L 29/12009 713/154 |
| 10,171,559 B2 * | 1/2019 | Cai | H04L 67/10 |
| 2012/0230343 A1 * | 9/2012 | Schrum, Jr. | H04L 12/5692 370/401 |
| 2015/0063364 A1 * | 3/2015 | Thakkar | H04L 12/66 370/401 |
| 2015/0200954 A1 * | 7/2015 | Gourlay | H04L 49/70 726/4 |
| 2016/0036728 A1 * | 2/2016 | Duda | H04L 12/4633 370/357 |
| 2016/0330046 A1 * | 11/2016 | Yang | H04L 12/4641 |
| 2017/0026417 A1 * | 1/2017 | Ermagan | H04L 12/4641 |
| 2017/0149582 A1 * | 5/2017 | Cohn | H04L 12/66 |

* cited by examiner

*Primary Examiner* — Brandon S Hoffman
(74) *Attorney, Agent, or Firm* — Patterson + Sheridan, LLP

(57) ABSTRACT

Certain embodiments described herein are generally directed to checking packets at a hardware tunnel endpoint. In some embodiments, an encapsulated packet is received at a hardware tunnel endpoint. It is determined if an inner source media access control (MAC) address is associated with an outer source internet protocol (IP) address of the encapsulated packet based on a mapping of MAC addresses of virtual computing instances to IP addresses of tunnel endpoints stored at the hardware tunnel endpoint. If it is determined the inner source MAC address is not associated with the outer source IP address, the packet is dropped.

17 Claims, 3 Drawing Sheets

ADDRESS CHECKING TO PROTECT AGAINST DENIAL OF SERVICE ATTACK

BACKGROUND

In virtualized computing systems, host machines generally host a plurality of virtual machines. In hosting virtual machines, a host machine may provide a virtual switch that connects virtual machines running on the host to communicate with other virtual machines hosted on the same host machine as well as virtual machines hosted on other hosts. For example, the virtual machines may be interconnected as part of a logical overlay network. Logical overlay networks may be implemented by the host by encapsulating egress packets from the virtual machines and decapsulating ingress packets. For example, Virtual Extensible Local Area Network (VXLAN) tunnel endpoint (VTEP) services for encapsulating packets (e.g., Geneve packet, VXLAN packet, etc.) may be implemented at each host or at a gateway. Edge VTEPs or hypervisor-based VTEPs are generally connected to virtual switches implemented by the hypervisor for virtual machines on the same physical host. Hardware VTEPs are often integrated into top-of-rack (TOR) switches, but could be provided as a stand-alone appliance for bridging logical overlay networks with physical networks. While the term "VTEP" refers to "VXLAN" tunneling protocol, it is now often used regardless of the tunneling protocol. The host may refer to internally-maintained forwarding tables that are populated by a control plane for determining whether to encapsulate packets and the targets of the encapsulation header based on the destination address of the original packet's header.

For example, a source virtual machine may generate an IP/MAC packet with the address of the source virtual machine set as the source address and the address of the destination virtual machine on a different host set as the destination address. The source virtual machine may send the packet to a virtual switch implemented on the same physical host as the source virtual machine. The virtual switch may, in accordance with forwarding tables associated with the virtual switch be connected to a VTEP which encapsulates the packet received from the source virtual machine to generate an encapsulated packet. The original packet may be referred to as an inner packet, and the encapsulated packet may be referred to as an outer packet. Further, a header of the inner packet including the address of the source virtual machine set as the source address and the address of the destination virtual machine set as the destination address may be referred to as an inner header. The VTEP may further include an outer header as part of the outer packet. The outer header may include a source address of the VTEP (e.g., source VTEP) generating and transmitting the encapsulated packet, and further may include a destination address of a VTEP (e.g., destination VTEP) associated with the destination virtual machine. Accordingly, in the overlay network, the outer header is used to forward the encapsulated packet through the overlay network from the source VTEP to the destination VTEP. The destination VTEP may then extract the inner packet and forward the original packet to a virtual switch connected to the destination VTEP, which forwards the original packet to the destination virtual machine based on the inner header of the decapsulated original packet.

In some aspects, physical machines that are not virtualized may be connected into the logical overlay network. For example, certain services (e.g., file server, database server, etc.) may run on a specific physical machine (e.g., physical servers) instead of in a virtual machine (VM) that is part of the overlay network. It may still be desirable, however, to connect the physical machine into the overlay network to gain the benefits of a software defined networking (SDN) solution. In order to couple the physical machines to the overlay network, hardware VTEPs may be utilized in the network to bridge packets between the physical machine's network and the overlay network. Securing use of such hardware VTEPs to protect against attacks (e.g., denial of service (DoS) attacks) of the overlay network may be desirable.

SUMMARY

Herein described are one or more embodiments of a method for checking packets at a hardware tunnel endpoint. The method includes receiving, at the hardware tunnel endpoint, an encapsulated packet, the encapsulated packet comprising an outer header comprising an outer destination internet protocol (IP) address and an outer source IP address, and an inner header comprising an inner source media access control (MAC) address. The method further includes determining, at the hardware tunnel endpoint, if the inner source MAC address is associated with the outer source IP address based on a mapping of MAC addresses of virtual computing instances to IP addresses of tunnel endpoints stored at the hardware tunnel endpoint. The method further includes dropping, at the hardware tunnel endpoint, the packet if it is determined the inner source MAC address is not associated with the outer source IP address. The method further includes forwarding, by the hardware tunnel endpoint, the packet based on the inner header if it is determined the inner source MAC address is associated with the outer source IP address.

Also described herein are embodiments of a non-transitory computer readable medium comprising instructions to be executed in a computer system, wherein the instructions when executed in the computer system perform a method described above for checking packets at a hardware tunnel endpoint.

Also described herein are embodiments of a computer system, wherein software for the computer system is programmed to execute the method described above for checking packets at a hardware tunnel endpoint.

DETAILED DESCRIPTION

Embodiments presented herein relate to protecting a logical overlay network including physical servers integrated into the logical overlay network using hardware VTEPs from attacks. In particular, embodiments presented herein relate to configuring a hardware VTEP with media access control (MAC) addresses of virtual computing instances coupled to the same logical switch as the hardware VTEP and/or Internet protocol (IP) addresses associated with the hypervisors (e.g., with the VTEPs) running on the physical machines that execute the virtual computing instances. The hardware VTEP may utilize the information about MAC addresses of virtual computing instances and/or IP addresses of hypervisors to determine whether a packet received at the hardware VTEP should be dropped or not. For example, the hardware VTEP may drop packets to prevent physical servers coupled to the hardware VTEP from recording improper mappings between MAC addresses and IP addresses in their address resolution protocol (ARP) tables (e.g., making virtual computing instances inaccessible by the physical servers). The hardware VTEP may further drop packets to prevent replication of packets with invalid MAC and/or IP addresses, which may lead to denial of service (DoS) in the logical overlay network.

Figure 1:
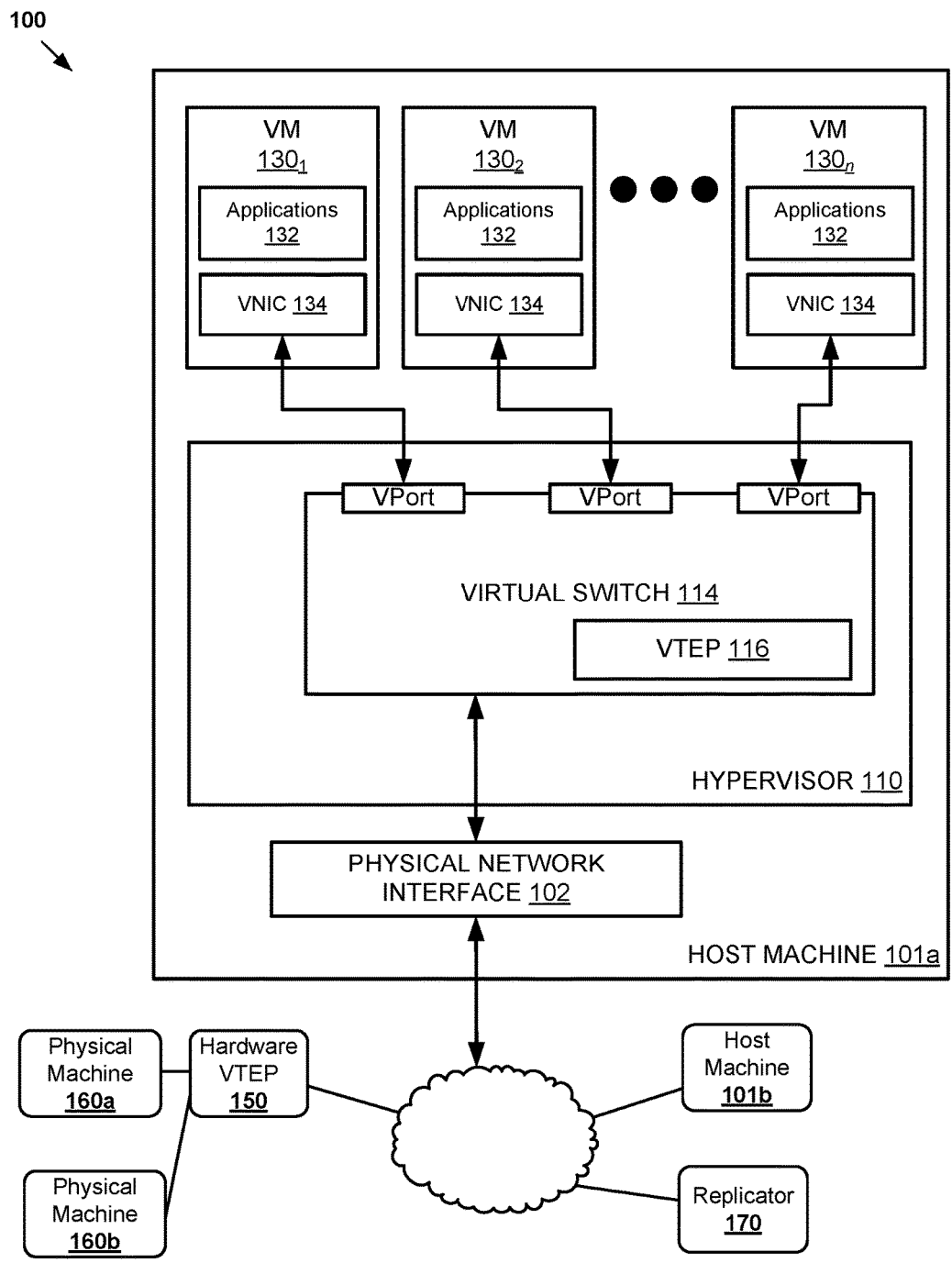
FIG. 1 is a block diagram of a network in which one or more embodiments of the present invention may be implemented.

FIG. 1 is a block diagram network 100, illustrating by way of example an environment for address checking as further described herein. It should be understood that network 100 may include additional and/or alternative components than that shown, depending on the desired implementation. Network 100 includes one or more host machines 101a, 101b. Network 100 further includes one or more hardware VTEPs 150 (only one shown) and one or more physical servers 160a, 160b.

As illustrated, host machine 101a includes a physical network interface 102, a hypervisor 110, and a plurality of virtual machines (VMs) $130_1$-$130_n$. Host machine 101a may provide part of a computing infrastructure including multiple host machines for implementing a logical overlay network. Though not shown, host machine 101b may include similar components as host machine 101a. Though certain embodiments are described herein with respect to VMs, the same principals and techniques may also apply to other appropriate virtual computing instances (e.g., containers (e.g., Docker containers), data compute nodes, isolated user space instances, namespace containers, etc.). As shown, hypervisor 110 and the plurality of virtual machines $130_X$ reside on host machine 101a. In certain embodiments, host machine 101a is a physical general purpose computer (e.g., a server, workstation, etc.). Although not shown in FIG. 1, host machine 101a may include one or more central processing units (CPUs), system memory, and non-volatile data storage, in addition to one or more network interfaces, such as physical network interface (PNIC) 102, for communicating with other hardware computing platforms, entities, or host machines on a physical network accessible through physical network interface 102.

Hypervisor 110 includes a virtual switch 114, which is like a physical network switch implemented in software. It serves as an interface between the hosted virtual machines 130, physical network interface 102, as well as other physical resources available on host machine 101a. Hypervisor 110 further includes a hypervisor-based VTEP 116 coupled to or part of the virtual switch 114. Accordingly, VTEP 116 is responsible for providing VTEP services for each of the VMs 130 on the same host machine 101a as VTEP 116. In alternate embodiments, virtual switch 114, VTEP 116, and/or physical device drivers may execute in a privileged virtual machine often referred to as a "Domain zero", "root-", or "parent-partition." Each virtual machine 130 includes a virtual network interface card (VNIC) 134, which is responsible for exchanging packets between the virtual machine 130 and hypervisor 110. VNICs 134 may be, in some cases, a software abstraction of a physical network interface card. Each virtual machine 130 is connected to a virtual port (vport) provided by virtual switch 114, and virtual switch 114 is connected to physical network interface 102 to allow network traffic to be exchanged between virtual machines 130 executing on host machine 101a and external network destinations. Virtual switch 114 may serve as a physical network switch, i.e., serve as an edge device on the physical network, but implemented in software.

In certain embodiments, each physical machine 160 is a physical general purpose computer (e.g., a server, workstation, etc.). Although not shown in FIG. 1, each physical machine 160 may include one or more central processing units (CPUs), system memory, and non-volatile data storage, in addition to one or more network interfaces, such as a PNIC for communicating with other hardware computing platforms, entities, or host machines on a physical network accessible through the PNIC.

In certain embodiments, VM $130_1$ and physical machine 160a may communicate with VMs on a logical overlay network using VTEP 150 as a bridge between the physical network on which physical machines 160 reside and logical overlay networks on which VM $130_1$ resides. The logical layer-2 network/broadcast domain may be identified by a network identifier (e.g., VXLAN network identifier (VNI)). For physical machine 160a to initially send packets to VM $130_1$, physical machine 160a may have an IP address of VM $130_1$, but not a MAC address of VM $130_1$. Accordingly, physical machine 160a may initiate an ARP query for the MAC address for the VM $130_1$. Accordingly, physical machine 160a may generate an ARP request and append a header to the ARP request including a source MAC address and source IP address of physical machine 160a, and a destination IP address of VM $130_1$. Since physical machine 160a does not know the destination MAC address for VM $130_1$ it may include a broadcast MAC address (e.g., ff:ff:ff:ff:ff:ff) as the destination MAC address in the header. Physical machine 160a sends the ARP request packet out over a PNIC of physical machine 160a and it is broadcast to the physical devices in the same physical layer-2 network/broadcast domain as physical machine 160a, including physical machine 160b and hardware VTEP 150. Physical machine 160b ignores the ARP request packet based on the destination IP address not being that of physical machine 160b.

Hardware VTEP 150, which may be implemented in or in conjunction with a top-of-rack switch (not shown) upon receiving the ARP request packet from physical machine 160a, determines it is a broadcast packet based on the destination MAC address and forwards the ARP request packet to replicator 170 (e.g., based on forwarding tables stored at hardware VTEP 150 which have replicator 170 as the next hop for broadcast, unknown unicast, and multicast (BUM) packets (e.g., packets that VTEP 150 does not have a mapping of a MAC address of the packet to a IP address and MAC address of a particular VTEP in its forwarding table) received by hardware VTEP 150, which may be configured by a central controller as discussed herein). Replicator 170 may be implemented on a separate physical system or with VTEP 150, e.g., within or in conjunction with a top-of-rack switch. Thus, depending on the implementation, hardware VTEP 150 may encapsulate the ARP request packet and set a destination IP address and destination MAC address of the outer header of the encapsulated packet as that of replicator 170, and a source IP address and source MAC address of the outer header as that of hardware VTEP 150. Hardware VTEP 150 further includes a network identifier (VNI) in the outer header that identifies the logical layer-2 network/broadcast domain of target VM 130.

Replicator 170, upon receiving the encapsulated packet, decapsulates the packet, and replicates the ARP request packet to be sent to each host machine 101 with at least one VM in the logical layer-2 network/broadcast domain identified by the network identifier in the outer header (e.g., based on a flood list stored at replicator 170 which indicates VTEPs associated with the logical layer-2 network/broadcast domain, which may be configured by a central controller as discussed herein). Replicator 170 further re-encapsulates each replicated packet and includes in an outer header of the replicated packet a source MAC address and source IP address of replicator 170, and a destination IP address and destination MAC address of VTEP 116 on host machine 101 for which the replicated packet is generated. Replicator 170 further includes a network identifier in the outer header that identifies the logical layer-2 network/broadcast domain of physical machine 160a. For example, for one encapsulated replicated packet, replicator 170 includes in the outer header a destination IP address and MAC address of VTEP 116 on host machine 101a. Replicator 170 then sends each generated packet to the appropriate host machine 101.

Each host machine 101 receives the encapsulated replicated packet, via PNIC 102, and the receiving VTEP 116 on the host machine 101 determines based on the destination MAC address of the inner packet that the inner packet is a broadcast packet. Further, VTEP 116 determines if any VMs 130 on the host machine 101 are part of the same logical layer-2 network as identified by the network identifier in the outer header. For any VMs 130 part of the logical layer-2 network, the VTEP 116 decapsulates the encapsulated replicated packet, and forwards the ARP request packet to the VM 130 (e.g., on the virtual switch the VM 130 is coupled to). Any VMs 130 receiving the ARP request packet with a different IP address than the destination IP address of the ARP request packet ignore the ARP request packet. VM 130$_1$ having the IP address corresponding to the destination IP address of the ARP request packet generates an ARP reply packet including a header with a source MAC address and IP address of the VM 130$_1$, and a destination MAC address and IP address of physical server 160a and forwards the packet to VTEP 116.

VTEP 116 encapsulates the ARP reply packet and, based on the ARP reply packet including a destination MAC address of physical server 160a, includes in an outer header of the encapsulated packet a destination MAC address and IP address of hardware VTEP 150 (e.g., based on forwarding tables stored at VTEP 116 that associate a MAC address of physical server 160a with a MAC address and IP address of hardware VTEP 150, which may be configured by a central controller as discussed herein or learned using a MAC learning procedure through received encapsulated packets).

In some cases, VTEP 116 may not have information mapping the MAC address of physical server 160a to a MAC address and IP address of hardware VTEP 150. Accordingly, VTEP 116 may query such information from the central controller, or alternatively perform a flooding procedure, whereby VTEP 116 replicates the packet and sends it to a set of destinations (e.g., all VTEPs that participate in the logical layer-2 network of VM 130$_1$, as indicated in a flood list, etc.). Each receiving VTEP may determine if the destination MAC address of the inner packet is associated with that VTEP. In other words, if the VTEP receiving a replicated packet from VTEP 116 is associated with a device (e.g., VM or physical server) that matches the destination MAC address of the inner packet, then it forwards the inner packet to the destination device. Otherwise, the VTEP may simply drop the received replicated packet. Accordingly, VTEP 116 sends the encapsulated packet to hardware VTEP 150, which decapsulates the packet and forwards the ARP reply packet to physical server 160a based on the destination MAC address and IP address of the ARP reply packet. Further, hardware VTEP 150, upon receiving the encapsulated packet may perform a MAC learning procedure whereby it associates the source MAC address and source IP address of the outer header (corresponding to VTEP 116) with the source MAC address of the inner header (corresponding to VM 130$_1$) in a forwarding table of the VTEP 150. Alternatively, forwarding tables of hardware VTEP 150 may be populated by a central controller.

Upon receiving the ARP reply packet, physical server 160a records a mapping of the MAC address of VM 130$_1$ to the IP address of VM 130$_1$ in an ARP table stored at the physical server 160a. Accordingly, for subsequent communications from physical server 160a to VM 130$_1$, physical server 160a can unicast packets to VM 130$_1$ by including the MAC address of VM 130$_1$ as the destination MAC address in the packet. For example, the physical server 160a may send a packet to hardware VTEP 150 with the destination IP address and MAC address of VM 130$_1$. Hardware VTEP 150 may encapsulate the packet as discussed and transmit the encapsulated packet to VTEP 116 associated with VM 130$_1$ (e.g., based on forwarding tables stored at VTEP 150 that associate VM 130$_1$ with hardware VTEP 116, which may be configured by a central controller as discussed herein or learned using a MAC learning procedure through received encapsulated packets).

A vulnerability to denial of service (DoS) attacks may be present if hardware VTEP 150 is not configured to check whether a tunnel source (e.g., source address of the outer header) of an encapsulated packet, such as an ARP reply packet, is valid or not, that is, whether a source address of the outer header is associated with a legitimate VTEP for the logical layer-2 network identified by the VNI in the packet's header. In such a scenario, an attacker using a device or VM on network 100 may maliciously generate an encapsulated packet, such as an ARP reply packet, including an outer header with a valid destination MAC and IP address of hardware VTEP 150, a source MAC address (e.g., of the attacker's device) and a source IP address (e.g., of the attacker's device). The encapsulated packet may further include in the inner header a valid source IP address of a VM in the logical layer-2 network (e.g., valid but not necessarily the legitimate IP address of the attacker's device/VM, such as the destination IP address from a ARP request packet), but a source MAC address that is not of that VM (e.g., an invalid MAC address, MAC address of the attacker's device, etc.). The encapsulated packet may further include in the inner header a destination MAC address (e.g., of a physical server 160)) and a destination IP address (e.g., of physical server 160). The encapsulated packet may further include in the outer header a valid network identifier of the logical layer-2 network.

When hardware VTEP 150 receives the attacker's packet, it decapsulates the packet and forwards it to the physical server 160 indicated by the destination MAC address in the inner header. If the top-of-rack switch associated with VTEP 150 is subjected to a MAC flooding attack, it could lose its mapping between the destination physical machine 160a's MAC address and the physical port it is connected to. In this case, the physical switch will treat the decapasulated packet as a BUM (i.e., unknown) packet and flood all physical servers 160 connected to the hardware switch. Each physical server 160 receiving the packet, if it does not already have a mapping of the source IP address in the packet to a MAC address in its ARP table, records the mapping of the source IP address in the packet to the source MAC address in the packet to the ARP table.

Accordingly, a physical server 160 may have a mapping of a valid IP address of a VM to the incorrect MAC address. When the physical server 160 then sends data to the VM with the IP address, it finds a corresponding MAC address (i.e., the incorrect MAC address) in its ARP table, and therefore generates a packet with the IP address of the VM and the incorrect MAC address. The physical server 160 forwards the packet to hardware VTEP 150, which based on the incorrect MAC address included in the packet may treat the packet as a BUM packet and encapsulate and send the packet to replicator 170. For example, hardware VTEP 150 may not be configured to perform a MAC learning procedure based on received encapsulated packets, and therefore may not have mapped the incorrect MAC address included as the source MAC address in the inner header of the attacker's packet to the source IP address and MAC address in the outer header of the attacker's packet. Instead, the forwarding tables of hardware VTEP 150 may be configured by a central controller. Therefore, hardware VTEP 150 may not have a mapping of the destination MAC address of the packet to a VTEP in its forwarding tables, because the MAC address is invalid, and therefore treat the packet as a BUM packet. Replicator 170 then replicates the packet, encapsulates each replicated packet, and sends the encapsulated replicated packets to the appropriate host machines as discussed. VTEPs 116 may determine that the MAC address does not belong to a VM on the host machine and drop the packet.

If many packets with incorrect destination MAC addresses are sent to replicator 170 for replication, then the resources of replicator 170 may be exhausted or prevented from being used for legitimate traffic. Further, physical servers 160 with a mapping of a valid IP address of a VM to the incorrect MAC address may never actually be able to send data to the VM due to the incorrect mapping. In addition, resources of VTEPs 116 may be exhausted or prevented from being used for legitimate traffic as they are used for processing the replicated packets. Accordingly, certain embodiments herein relate to techniques for checking at a hardware VTEP (e.g., hardware VTEP 150) whether a tunnel source of an encapsulated packet is for a legitimate VTEP by checking a source address in an outer header of the encapsulated packet and/or if an inner source MAC address of the encapsulated packet is for a VM associated with the tunnel source. If either the source address in the outer header is not for a legitimate VTEP, or the inner source MAC address of the encapsulated packet is not for a VM associated with the tunnel source, the hardware VTEP drops the packet to avoid physical servers 160 from recording improper mappings in their ARP tables, and the corresponding effects such as DoS and/or unreachable VMs.

Figure 2:
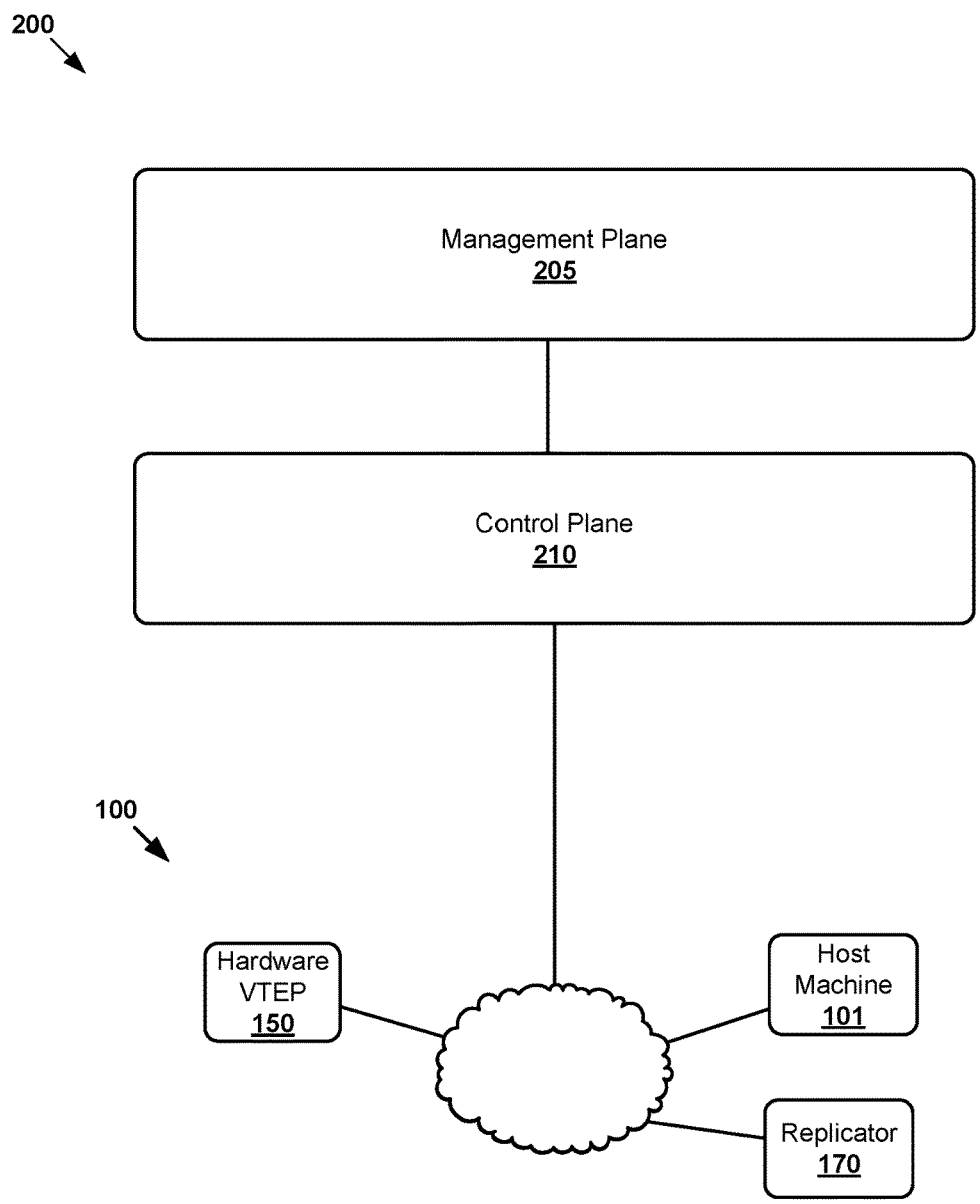
FIG. 2 is a block diagram of a network control system for the network of FIG. 1.

FIG. 2 is a block diagram of a network control system 200 for the network 100 of FIG. 1. Specifically, as shown, the network control system 200 includes a management plane 205 and a central control plane 210. Further, network control system 200 may include one or more local controllers (also called the local control plane) (not shown) that operate on host machines 101.

Though shown as single entities, it should be understood that both the management plane 205 and central control plane 210 may be implemented as distributed or clustered systems. That is, management plane 205 may include multiple computers that implement management plane functions, and central control plane 210 may include multiple controller computers or virtual machines or containers (or other logical compute instances) that implement central control plane functions. In some embodiments, one or more such centralized controllers includes both management plane and central control plane functions (e.g., as separate applications or functions).

In some embodiments, management plane 105 is responsible for receiving logical network configuration inputs (e.g., through an application programming interface). Users (e.g., network administrators) may further input logical network configuration data through, e.g., a command-line interface, a graphical user interface, etc. Each logical network configuration for each logical network, in some embodiments, may include data defining one or more VMs 130 and the connections between them.

Control plane 210 pushes information to host machines 101, hardware VTEP 150, and replicator 170. For example, control plane 210 may be configured to push forwarding tables to host machines 101, hardware VTEP 150, and replicator 170, that may be used as discussed. The forwarding tables may, for example, indicate a next hop for BUM packets, which VTEPs are associated with which logical layer-2 network/broadcast domain, which VTEPs are associated with which VMs, host machines, or physical servers, etc.

In certain embodiments, control plane 210 controllers may communicate utilizing a proprietary protocol with host machines 101 and replicator 170, while hardware VTEPs may communicate using another protocol (e.g., Open vSwitch database (OVSDB)). Accordingly, in certain embodiments, a ToR (top of rack) agent may be running on control plane 210 that serves as an "adapter" for communication with hardware VTEP 150.

In certain embodiments, when a hardware VTEP 150 joins a particular logical switch (e.g., is added as part of a logical layer-2 network/broadcast domain), control plane 210 pushes information mapping MAC addresses of VMs to IP addresses of VTEPs associated with the VMs that are in the same logical layer-2 network/broadcast domain as hardware VTEP 150. For example, when a VM is instantiated on a host machine, the local controller of the host machine sends a MAC address of the VM to the control plane 210, and the control plane 210 records a mapping of the MAC address of the VM to the IP address of the VTEP on the host machine and forwards the mapping to hardware VTEP 150. In certain embodiments, the hardware VTEP 150 stores the IP addresses of the VTEPs in a list (e.g., referred to as a VTEP list) associated with a network identifier of the logical layer-2 network/broadcast domain. In certain embodiments, the hardware VTEP 150 further stores a mapping of MAC addresses of VMs to VTEPs (e.g., as a table) associated with a network identifier of the logical layer-2 network/broadcast domain.

Figure 3:
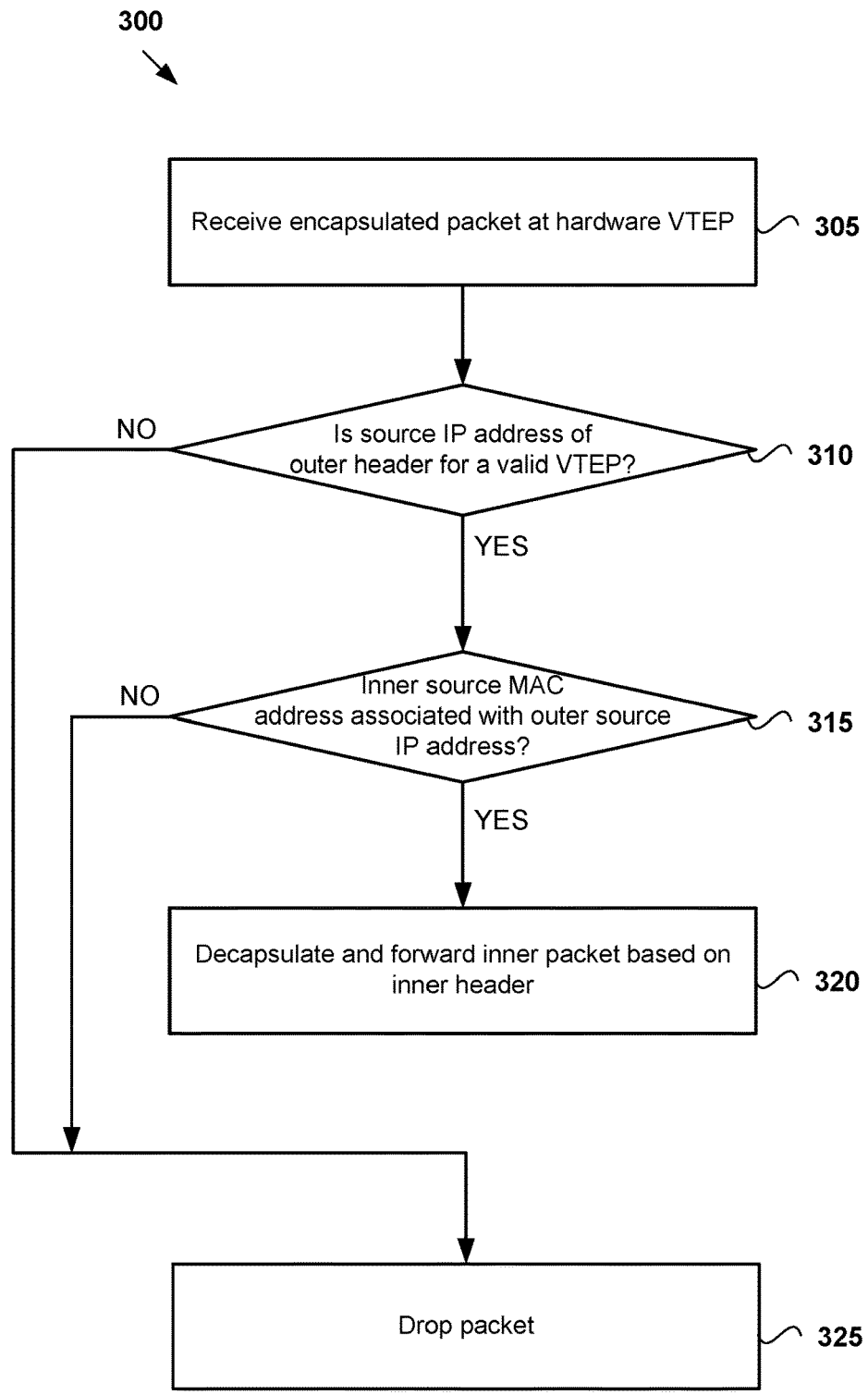
FIG. 3 illustrates example operations for checking packets at a hardware VTEP to protect a logical overlay network.

FIG. 3 illustrates example operations 300 for checking packets at a hardware VTEP. For example, operations 300 may be performed by hardware VTEP 150.

At 305, hardware VTEP 150 receives an encapsulated packet. The encapsulated packet includes an inner and an outer header. The outer header includes a destination MAC address and destination IP address of hardware VTEP 150.

At 310, hardware VTEP 150 optionally determines if a source IP address of the outer header of the encapsulated packet is for a VTEP that is in the same logical layer-2 network/broadcast domain as hardware VTEP 150. For example, hardware VTEP 150 determines if the source IP address in the outer header is in a VTEP list for the logical layer-2 network/broadcast domain stored at hardware VTEP 150. In certain aspects, the hardware VTEP 150 checks a VTEP list associated with the logical layer-2 network/broadcast domain by selecting a VTEP list associated with a network identifier in the encapsulated packet. If at 310, hardware VTEP 150 determines the source IP address in the outer header is not for a VTEP that is in the same logical layer-2 network/broadcast domain as hardware VTEP 150, the hardware VTEP 150 drops the packet at 325, and operations 300 end. However, if hardware VTEP 150 determines the source IP address in the outer header is for a VTEP in the same logical layer-2 network/broadcast domain as hardware VTEP 150, operations 300 continue to 315.

At 315, hardware VTEP 150 determines if a source MAC address of the inner header of the encapsulated packet is for a VM that is associated with a VTEP having the source IP address of the outer header. For example, hardware VTEP 150 determines if an entry in a table stored at hardware VTEP 150 maps the source MAC address to the source IP address. In certain aspects, the hardware VTEP 150 checks a table associated with the logical layer-2 network/broadcast domain by selecting a table associated with a network identifier in the encapsulated packet. If at 315, hardware VTEP 150 determines the source MAC address of the inner header of the encapsulated packet is not for a VM that is associated with a VTEP having the source IP address of the outer header, the hardware VTEP 150 drops the packet at 325, and operations 300 end. However, if hardware VTEP 150 determines the source MAC address of the inner header of the encapsulated packet is for a VM that is associated with a VTEP having the source IP address of the outer header, operations 300 continue to 320.

In certain embodiments, operations 300 do not include 310, and instead continue from 305 to 315 directly. However, including 310 in operations 300 may provide certain advantages. For example, typically, a given host machine executes more than one VM. Accordingly, for each VTEP, there are multiple associated VMs, each with their own MAC address. Therefore, searching through all the MAC addresses in a table stored at hardware VTEP 150 for one that matches the source MAC address of the inner header of the encapsulated packet may take much longer than checking to see if the source IP address in the outer header is in a VTEP list. Further, (e.g., if the source IP address in the outer header is in the VTEP list) the hardware VTEP in certain aspects may just search through entries in the table that include the source IP address of the outer header and determine if one of those entries is for the source MAC address of the inner header.

At 320, hardware VTEP 150 decapsulates and forwards the inner packet of the encapsulated packet based on the inner header of the inner packet.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims.

Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for checking packets at a hardware tunnel endpoint, the method comprising:
   receiving, at the hardware tunnel endpoint from a controller, information regarding a mapping of media access control (MAC) addresses of virtual computing instances to internet protocol (IP) addresses of tunnel endpoints;
   receiving, at the hardware tunnel endpoint, an encapsulated packet, the encapsulated packet comprising an outer header comprising an outer destination IP address and an outer source IP address, and an inner header comprising an inner source MAC address;
   determining, at the hardware tunnel endpoint, if the inner source MAC address is associated with the outer source IP address based on the mapping stored at the hardware tunnel endpoint;
   dropping, at the hardware tunnel endpoint, the packet if it is determined the inner source MAC address is not associated with the outer source IP address; and
   forwarding, by the hardware tunnel endpoint, the packet based on the inner header if it is determined the inner source MAC address is associated with the outer source IP address.

2. The method of claim 1, wherein the mapping is further associated with a network identifier, wherein the network identifier is included in the encapsulated packet.

3. The method of claim 1, further comprising:
   determining, at the hardware tunnel endpoint, if the outer source IP address is valid based on a list of IP addresses of tunnel endpoints stored at the hardware tunnel endpoint; and
   dropping, at the hardware tunnel endpoint, the packet if it is determined the outer source IP address is not valid and not performing determining if the inner source MAC address is associated with the outer source IP.

4. The method of claim 1, wherein forwarding the packet comprises decapsulating the encapsulated packet to retrieve an inner packet and forwarding the inner packet.

5. The method of claim 1, wherein the mapping is for virtual computing instances associated with a logical layer-2 network identified by a network identifier included in the encapsulated packet.

6. The method of claim 5, wherein the hardware tunnel endpoint is part of the logical layer-2 network.

7. A non-transitory computer readable medium comprising instructions to be executed in a computer system, wherein the instructions when executed in the computer system perform a method for checking packets at a hardware tunnel endpoint, the method comprising:
   receiving, at the hardware tunnel endpoint from a controller, information regarding a mapping of media access control (MAC) addresses of virtual computing instances to internet protocol (IP) addresses of tunnel endpoints;
   receiving, at the hardware tunnel endpoint, an encapsulated packet, the encapsulated packet comprising an outer header comprising an outer destination IP address and an outer source IP address, and an inner header comprising an inner source MAC address;
   determining, at the hardware tunnel endpoint, if the inner source MAC address is associated with the outer source IP address based on the mapping stored at the hardware tunnel endpoint;
   dropping, at the hardware tunnel endpoint, the packet if it is determined the inner source MAC address is not associated with the outer source IP address; and
   forwarding, by the hardware tunnel endpoint, the packet based on the inner header if it is determined the inner source MAC address is associated with the outer source IP address.

8. The non-transitory computer readable medium of claim 7, wherein the mapping is further associated with a network identifier, wherein the network identifier is included in the encapsulated packet.

9. The non-transitory computer readable medium of claim 7, wherein the method further comprises:
   determining, at the hardware tunnel endpoint, if the outer source IP address is valid based on a list of IP addresses of tunnel endpoints stored at the hardware tunnel endpoint; and
   dropping, at the hardware tunnel endpoint, the packet if it is determined the outer source IP address is not valid and not performing determining if the inner source MAC address is associated with the outer source IP.

10. The non-transitory computer readable medium of claim 7, wherein forwarding the packet comprises decapsulating the encapsulated packet to retrieve an inner packet and forwarding the inner packet.

11. The non-transitory computer readable medium of claim 7, wherein the mapping is for virtual computing instances associated with a logical layer-2 network identified by a network identifier included in the encapsulated packet.

12. The non-transitory computer readable medium of claim 11, wherein the hardware tunnel endpoint is part of the logical layer-2 network.

13. A computer system, wherein system software for the computer system is programmed to execute a method for checking packets at a hardware tunnel endpoint, said method comprising:
- receiving, at the hardware tunnel endpoint from a controller, information regarding a mapping of media access control (MAC) addresses of virtual computing instances to internet protocol (IP) addresses of tunnel endpoints;
- receiving, at the hardware tunnel endpoint, an encapsulated packet, the encapsulated packet comprising an outer header comprising an outer destination IP address and an outer source IP address, and an inner header comprising an inner source MAC address;
- determining, at the hardware tunnel endpoint, if the inner source MAC address is associated with the outer source IP address based on the mapping stored at the hardware tunnel endpoint;
- dropping, at the hardware tunnel endpoint, the packet if it is determined the inner source MAC address is not associated with the outer source IP address; and
- forwarding, by the hardware tunnel endpoint, the packet based on the inner header if it is determined the inner source MAC address is associated with the outer source IP address.

14. The computer system of claim 13, wherein the mapping is further associated with a network identifier, wherein the network identifier is included in the encapsulated packet.

15. The computer system of claim 13, wherein the method further comprises:
- determining, at the hardware tunnel endpoint, if the outer source IP address is valid based on a list of IP addresses of tunnel endpoints stored at the hardware tunnel endpoint; and
- dropping, at the hardware tunnel endpoint, the packet if it is determined the outer source IP address is not valid and not performing determining if the inner source MAC address is associated with the outer source IP.

16. The computer system of claim 13, wherein forwarding the packet comprises decapsulating the encapsulated packet to retrieve an inner packet and forwarding the inner packet.

17. The computer system of claim 13, wherein the mapping is for virtual computing instances associated with a logical layer-2 network identified by a network identifier included in the encapsulated packet.

* * * * *